United States Patent Office 2,716,668
Patented Aug. 30, 1955

2,716,668
POLYHALOGENOMETHANES

Robert Neville Haszeldine, Cambridge, England

No Drawing. Application September 15, 1953,
Serial No. 380,349

Claims priority, application Great Britain
November 10, 1952

1 Claim. (Cl. 260—653)

This invention relates to the preparation of polyhalogenomethanes containing fluorine and at least one other halogen, some of which have been heretofore unknown.

It is known that by the heating of the silver salt of trifluoroacetic acid with iodine, bromine, or chlorine, it is possible to obtain trifluoromethyl iodide, bromide, and chloride respectively. (R. N. Haszeldine, J. Chem. Soc. 1951, 584–587.)

It is also known that by heating silver acetate with bromine there is obtained methyl bromide. (U. S. Patent 2,176,181 (1939) to Hunsdiecker et al.)

It has now been found that the silver salts of the much less stable halogenofluoroacetic acids either fully substituted or containing unsubstituted hydrogen, may be heated with elemental iodine, bromine, or chlorine to produce the analogous substituted polyhalogenomethanes, the term "halogeno" in the name halogeno-fluoroacetic acid being used to denote a halogen other than fluorine.

In carrying out the process of the invention, the halogenofluoroacetic acid containing at least one fluorine atom on the alpha carbon atom is converted to its silver salt, and a mixture of this salt and the selected halogen (chlorine, bromine, or iodine), preferably used in stoichiometric excess, is heated to decarboxylation temperature, generally in the range —20° to +300° C., at a pressure in the range of about 0.001 atmosphere to about 50 atmospheres for a period of time in the range of about 0.1 hour to about 10 hours. A fluorohalogenomethane corresponding to the alpha carbon atom of the acetic acid with its substituents, and the selected halogen added, is thereby produced. The reaction may be represented generally thus:

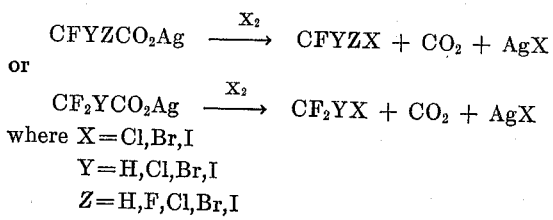

where X=Cl,Br,I
Y=H,Cl,Br,I
Z=H,F,Cl,Br,I

By the process of the invention a number of halogenomethanes not previously known have been prepared. These include chlorofluoroiodomethane, bromofluoroiodomethane, dibromochlorofluoromethane, bromodichlorofluoromethane, bromochlorodifluoromethane, and dichlorofluoroiodomethane. Furthermore, an alternative and in most cases a much simpler method for the preparation of chlorofluoromethane, bromofluoromethane, fluoroiodomethane, dichlorofluoromethane, bromochlorofluoromethane, dibromofluoromethane, fluorodiiodomethane, chlorodifluoromethane, bromodifluoromethane, difluoroiodomethane, trichlorofluoromethane, dibromodifluoromethane, and dichlorodifluoromethane is hereby made available.

The following examples, in which all parts are by weight, make clear the application of this invention to the preparation of this class of compounds but are not intended to limit the invention.

Example 1

Silver monofluoroacetate (9.2 parts) was heated in a sealed tube with a 10% stoichiometric excess of chlorine for five hours at a temperature of 50° to 120° C. Fractionation of the reaction mixture gave a 52% yield of $CH_2FCl$; B. P. 8.5° C.

Example 2

Example 1 was repeated using a 5% stoichiometric excess of bromine instead of chlorine to produce a 62% yield of $CH_2FBr$; B. P. 17.5° C.

Example 3

Silver monofluoroacetate (8.2 parts) was mixed with a 150% stoichiometric excess of iodine and heated to 180°–260° C. with continuous removal of the products under vacuum into a trap cooled in liquid air, to give a 55% yield of $CH_2FI$; B. P. 52–53° C.

Example 4

Silver chlorofluoroacetate (3.1 parts) was heated as in Example 1 above to give a 73% yield of $CHFCl_2$; B. P. 9° C.

Example 5

Silver chlorofluoroacetate (3.1 parts) was heated as in Example 2 above to give a 67% yield of $CHFBrCl$; B. P. 36.5° C.

Example 6

Silver chlorofluoroacetate (4.2 parts) was heated as in Example 3 above to give a 35% yield of $CHClFI$; B. P. 35° C./150 mm. or Ca. 76° C./760 mm.

Example 7

Silver bromofluoroacetate (3.3 parts) was heated as in Example 1 above, except that a temperature of 40° C. was employed, to give a 67% yield of $CHFBrCl$.

Example 8

Silver bromofluoroacetate (3.3 parts) was heated as in Example 2 above, except that a temperature of 100° C. was employed, to give a 64% yield of $CHBr_2F$; B. P. 64.5° C.

Example 9

Silver bromofluoroacetate (5.1 parts) was heated as in Example 3 above, except that a pressure of 1 mm. and a 300% stoichiometric excess of iodine was employed to give a 19% yield of $CHBrFI$; B. P. 35° C./70 mm. or 102–104° C./760 mm. (with some decomposition).

Example 10

Silver fluoroiodoacetate was heated with a 300% stoichiometric excess of iodine and at a pressure of 1 mm. as in Example 9 above to give an 18% yield of $CHFI_2$; B. P. 50° C./50 mm.

Example 11

Silver difluoroacetate (3.2 parts) was heated at 50° C. with a 10% stoichiometric excess of chlorine in a steel autoclave to give a 91% yield of $CHClF_2$; B. P. —41° C.

Example 12

Silver difluoroacetate (3.1 parts) was heated with a 50% stoichiometric excess of bromine at a temperature of 50–60° C. and finally at 100° C. to give an 88% yield of $CHBrF_2$; B. P. —15° C.

Example 13

Silver difluoroacetate (3.1 parts) was heated in an autoclave with a 5% stoichiometric excess of bromine to give a 93% yield of $CHBrF_2$.

Example 14

Silver difluoroacetate (10.1 parts) was mixed with a 50% stoichiometric excess of iodine and heated at a temperature of about 150° C. to give a 93% yield of $CHF_2I$; B. P. 20.5° C.

Example 15

Silver bromochlorofluoroacetate (5 parts) was heated with bromine as in Example 2 above to give a 71% yield of $CBr_2ClF$; B. P. 79.5–80.5° C.

Example 16

Silver bromochlorofluoroacetate heated with chlorine according to the procedure of Example 2 above gave a 63% yield of $CBrCl_2F$.

Example 17

Silver bromodifluoroacetate was heated with a stoichiometric excess of bromine as in Example 2 above to give an 81% yield of $CBr_2F_2$; B. P. 25° C.

Example 18

Silver chlorodifluoroacetate (5 parts) was heated with chlorine as in Example 1 above to give an 88% yield of $CCl_2F_2$; B. P. −29.5° C.

Example 19

Silver chlorodifluoroacetate (5 parts) was heated with bromine as in Example 2 above to give a 91% yield of $CBrClF_2$; B. P. −4° C.

Example 20

Silver chlorodifluoroacetate (5 parts) was heated with a stoichiometric excess of iodine as in Example 3 above and at a pressure of 10 mm. of Hg. to give a 78% yield of $CClF_2I$; B. P. 33° C.

Example 21

Silver dichlorofluoroacetate (3 parts) was heated with bromine as in Example 2 above to give $CBrCl_2F$; B. P. 51–52° C., in 58% yield.

Example 22

Substitution of chlorine for bromine in Example 21 above gave $CCl_3F$ in 63% yield, B. P. 23–24° C.

Example 23

Silver dichlorofluoroacetate (3 parts) was heated with iodine as in Example 3 to give $CCl_2FI$ in 10% yield, B. P. 44–46° C./210 mm.

The compounds of the invention are useful as chemical intermediates, refrigerants, and fire-extinguishing media.

It will be obvious to those skilled in the art that many modifications may be made within the scope of the present invention without departing from the spirit thereof, and the invention includes all such modifications.

I claim:

A halogenomethane selected from the group consisting of chlorofluoroiodomethane and bromofluoroiodomethane.

References Cited in the file of this patent

UNITED STATES PATENTS

| | | |
|---|---|---|
| 2,647,933 | La Zerte et al. | Aug. 4, 1953 |
| 2,678,953 | Conley | May 18, 1954 |

OTHER REFERENCES

Stepanov Compte Rendus, (Doklady) U. S. S. R. 45, No. 2, pages 56 and 57 (1944).

Delvvalle et al., Compte Rendus 214, pages 828 to 830 (1944).

Haupschein et al., J. A. C. S. 73, pages 2461 to 2463 (June 1951).

Haupschein et al., J. A. C. S. 74, pages 1347 to 1350 (March 5, 1952).

"Nature," volume 166, pages 192–193 (July 29, 1950).